United States Patent
Yamamoto et al.

(10) Patent No.: US 8,306,126 B2
(45) Date of Patent: Nov. 6, 2012

(54) MOVING PICTURE ENCODING APPARATUS AND MOVING PICTURE DECODING APPARATUS

(75) Inventors: Tomoyuki Yamamoto, Osaka (JP); Maki Takahashi, Osaka (JP); Tomoko Aono, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 760 days.

(21) Appl. No.: 12/518,937

(22) PCT Filed: Dec. 4, 2007

(86) PCT No.: PCT/JP2007/073363
§ 371 (c)(1),
(2), (4) Date: Jun. 12, 2009

(87) PCT Pub. No.: WO2008/072500
PCT Pub. Date: Jun. 19, 2008

(65) Prior Publication Data
US 2010/0080291 A1    Apr. 1, 2010

(30) Foreign Application Priority Data
Dec. 13, 2006 (JP) .................................. 2006-336072

(51) Int. Cl.
*H04N 7/12* (2006.01)
(52) U.S. Cl. .................. 375/240.25; 375/240.01
(58) Field of Classification Search .................. 375/240, 375/240.01, 240.12, 240.25
See application file for complete search history.

(56) References Cited

U.S. PATENT DOCUMENTS

| | | | |
|---|---|---|---|
| 5,764,296 A | 6/1998 | Shin | |
| 6,456,663 B1 * | 9/2002 | Kim | 375/240.25 |
| 7,116,713 B2 | 10/2006 | Hagiwara | |
| 2006/0233254 A1 | 10/2006 | Lee et al. | |
| 2006/0268991 A1 | 11/2006 | Segall et al. | |
| 2007/0242751 A1 | 10/2007 | Kitayama | |

FOREIGN PATENT DOCUMENTS

| | | |
|---|---|---|
| EP | 1 720 358 A2 | 11/2006 |
| JP | 6-351008 A | 12/1994 |
| JP | 9-200772 A | 7/1997 |
| JP | 2001-128183 A | 5/2001 |
| JP | 2006-295408 A | 10/2006 |
| JP | 2006-295913 A | 10/2006 |

(Continued)

OTHER PUBLICATIONS

"8.3 Intra prediction process", ISO/IEC 14496-10:2004 Advanced Video, Mar. 2004, pp. 101-111.

(Continued)

*Primary Examiner* — Allen Wong
(74) *Attorney, Agent, or Firm* — Birch, Stewart, Kolasch & Birch, LLP

(57) ABSTRACT

A prediction control unit determines whether to use intra-prediction method or a method of prediction based on reduced image in which a predicted image is generated using a locally decoded image of a block as an object of coding that has been coded and reduced, according to the amount of high-frequency component contained in the block as the object of coding. When use of intra-prediction method is determined, locally decoded images of previously-encoded neighboring blocks stored in a frame memory are down-sampled by a down-sampling unit and subjected to intra-prediction by an intra-prediction unit, and coding is done using the prediction data. When use of prediction method based of reduced image is determined, inter-layer prediction is done using neighboring images obtained by reading locally decoded images resulting from a process of a lower layer from the frame memory, and coding is done using the prediction data.

2 Claims, 9 Drawing Sheets

FOREIGN PATENT DOCUMENTS

| JP | 2007-288446 A | 11/2007 |
|---|---|---|
| WO | WO 2006/080779 A1 | 8/2006 |

OTHER PUBLICATIONS

"G.8.9.3 Upsampling process for Intra_Base prediction", ISO/IEC 14496-10:2006/FPDAM3 Scalable Video Coding, Oct. 2006, pp. 467-469.

Lin et al., "Adaptive Downsampling to Improve Image Compression at Low Bit Rates", IEEE Transactions on Image Processing, vol. 15, No. 9, Sep. 2006, pp. 2513-2521.

Reichel et al., "Joint Scalbale Video Model JSVM 1" Jan. 21, 2005, pp. 1-49.

* cited by examiner

MOVING PICTURE ENCODING APPARATUS AND MOVING PICTURE DECODING APPARATUS

TECHNICAL FIELD

The present invention relates to a moving picture encoding apparatus attaining highly efficient coding of moving pictures, and to a moving picture decoding apparatus for decoding coded data encoded by the moving picture encoding apparatus.

BACKGROUND ART

Moving picture encoding apparatus and moving picture decoding apparatus in compliance with moving picture encoding methods described in Non-Patent Document 1 (ISO/IEC 14496-10:2004 Advanced Video Coding) and Non-Patent Document 2 (ISO/IEC 14496-10:2006/FPDAM3 Scalable Video Coding) have been known as background art realizing highly efficient coding and decoding utilizing spatial and temporal correlations of moving pictures.

Such methods of moving picture coding will be described in the following. First, the moving picture encoding method described in Non-Patent Document 1 (hereinafter referred to as Background Art 1) will be described. The moving picture encoding method of Background Art 1 is intra-prediction coding in which a predicted image of a block as an object of coding is generated through intra-prediction using locally decoded images of previously-encoded neighboring blocks, and coding is done using the predicted image. The method will be described more specifically in the following.

FIG. 6 is a block diagram of the moving picture encoding apparatus utilizing Background Art 1. Referring to FIG. 6, the moving picture encoding apparatus utilizing Background Art 1 includes an intra-prediction unit 1, an orthogonal transformation unit 2, a quantization unit 3, an inverse quantization unit 4, an inverse orthogonal transformation unit 5, a frame memory 6, and a variable length coding unit 9.

Intra-prediction unit 1 performs intra-prediction utilizing spatial correlation of images, and thereby generates a predicted image. Orthogonal transformation unit 2 orthogonally transforms input data. Quantization unit 3 quantizes input data. Inverse quantization unit 4 performs inverse quantization that is an operation reverse to that of quantization unit 3. Inverse orthogonal transformation unit 5 performs inverse orthogonal transformation that is an operation reverse to that of orthogonal transformation unit 2. Frame memory 6 temporarily stores images. Variable length coding unit 9 performs variable length coding on input data.

The moving picture encoding apparatus of Background Art 1 shown in FIG. 6 operates in the following manner.

<Step 501>

An image as an object of coding is divided to blocks of a prescribed size (blocks each of M×M pixels), and each block (hereinafter referred to as an object block of coding) is input to the moving picture encoding apparatus.

<Step 502>

Intra-prediction unit 1 generates a predicted image (a block of M×M pixels) corresponding to the input object block of coding.

The predicted image is generated by intra-prediction using locally decoded images of previously-encoded neighboring blocks stored in frame memory 6. The "previously-encoded neighboring blocks" refer to blocks of M×M pixels that have been already encoded at a stage preceding by one the present object block of coding (the block of M×M pixels), that is, four blocks of M×M pixels that have been locally decoded, at the left, above, upper left and upper right positions of the object block of coding.

<Step 503>

Prediction residue data (a block of M×M pixels) representing difference between the object block of coding and the predicted image of the block is input to orthogonal transformation unit 2 and quantization unit 3 in this order, and subjected to orthogonal transformation and quantization, respectively.

<Step 504>

Further, the quantized prediction residue data is locally decoded through processes at inverse quantization unit 4 and inverse orthogonal transformation unit 5, and then synthesized with the predicted image generated at step 502, whereby it is stored as the locally decoded image (a block of M×M pixels) of the object block of coding, in frame memory 6.

<Step 505>

The quantized prediction residue data is also input to variable length coding unit 9 and subjected to variable length coding, and then output as coded data.

<Step 506>

Steps 501 to 505 are repeated on all object blocks of coding forming the image as the object of coding.

The encoding process of Background Art 1 is realized through the process steps as described above, where intra-prediction by intra-prediction unit 1 and orthogonal transformation by orthogonal transformation unit 2 reduce spatial redundancy of the image as the object of coding, providing efficient coding.

The moving picture encoding method described in Non-Patent Document 2 (hereinafter referred to as Background Art 2) will be described. According to Background Art 2, coding is done utilizing so-called hierarchical encoding. Specifically, hierarchical encoding process is adopted, in which the block as the object of coding is subjected to inter-layer prediction predicting a layer as the object of coding utilizing inter-layer redundancy based on information of previously coded layers, and coding is done using the predicted image.

FIG. 7 shows a block diagram of the moving picture encoding apparatus utilizing Background Art 2. Referring to FIG. 7, the moving picture encoding apparatus utilizing Background Art 2 further includes a down-sampling unit 7, an up-sampling unit 8, change-over switches 10, a filtering unit 13, and a layer switching control unit 14.

Down-sampling unit 7 generates a reduced image by thinning-out pixels of an input image. Up-sampling unit 8 generates an enlarged image by interpolating pixels to the input image. Change-over switch 10b switches and outputs two types of input data in accordance with prescribed conditions. Filtering unit 13 performs low-pass filtering on the input image. Layer switching control unit 14 controls switching of layers as the object of coding.

Other components are the same as those of moving picture encoding apparatus shown in FIG. 6 and, therefore, description thereof will not be repeated. Since there are a plurality of change-over switches 10 in the figure, these will be identified by suffixes a and b. In the following, where there are a plurality of same elements, each will be identified in the similar manner.

The moving picture encoding apparatus in accordance with Background Art 2 shown in FIG. 7 operates in the following manner. In the following, only an example in which the object image of coding is encoded in a hierarchical manner in upper and lower two layers will be described. The upper layer of hierarchy is adopted to include high frequency and low frequency components, while the lower layer is adopted to include only the low frequency component. By way of example, when a VGA image (640×480 pixels) is to be hierarchically encoded in two layers, the VGA image is used as the upper layer and a QVGA image (320×240 pixels) that is generated by reducing the image of the upper layer is used as the lower layer.

<Step 601>

First, in order to encode the lower layer, layer switching control unit 14 controls change-over switches 10a and 10b. A reduced image output from down-sampling unit 7 is selected as the output of change-over switch 10a, and a predicted image output from intra-prediction unit 1 is selected as the output of change-over switch 10b.

<Step 602>

The object image of coding is divided to blocks of a prescribed size (blocks each of N×N pixels), and each block (hereinafter referred to as object block of coding) is input to the moving picture encoding apparatus.

<Step 603>

The object block of coding is subjected to low-pass filtering at filtering unit 13, and then, a reduced image (a block of M×M pixels) corresponding to the object block of coding is generated at down-sampling unit 7. Here, the integers N and M representing the block size satisfy the relation of $N=\alpha M$ ($\alpha$ is an arbitrary integer).

<Step 604>

Intra-prediction unit 1 generates a predicted image (a block of M×M pixels) corresponding to the reduced image generated at step 603.

The predicted image is generated by performing intra-prediction similar to that of Background Art 1, on the locally decoded images (lower layer) of previously-encoded neighboring blocks stored in frame memory 6.

<Step 605>

Prediction residue data (a block of M×M pixels) representing difference between the reduced image generated at step 603 and the predicted image of the corresponding block is input to orthogonal transformation unit 2 and quantization unit 3 in this order, and orthogonal transformation and quantization are executed, respectively.

<Step 606>

Further, the quantized prediction residue data is locally decoded through processes at inverse quantization unit 4 and inverse orthogonal transformation unit 5, and then synthesized with the predicted image generated at step 604, whereby it is stored as a locally decoded image (a block of M×M pixels) of the object block of coding, in frame memory 6.

<Step 607>

Further, the quantized prediction residue data is also input to variable length coding unit 9 and subjected to variable length coding, and output as coded data.

<Step 608>

Steps 601 to 607 are repeated on all object blocks of coding forming the image as the object of coding.

<Step 609>

Next, for encoding the upper layer, layer switching control unit 14 controls change-over switches 10a and 10b. The object image of coding is selected as the output of change-over switch 10a and the enlarged image output from up-sampling unit 8 is selected as the output of change-over switch 10b, respectively.

<Step 610>

The object image of coding is divided to blocks of a prescribed size (blocks each of M×M pixels), and each block (hereinafter referred to as object block of coding) is again input to the moving picture encoding apparatus.

<Step 611>

Up-sampling unit 8 generates, based on the locally decoded image of the lower layer corresponding to the object block of coding stored in frame memory 6, an enlarged image (a block of M×M pixels) corresponding to the block, by interpolation. The enlarged image is output as the predicted image of object block of coding.

<Step 612>

Prediction residue data (a block of M×M pixels) representing difference between the object block of coding and the predicted image obtained by the inter-layer prediction is input to orthogonal transformation unit 2 and quantization unit 3 in this order, and orthogonal transformation and quantization are executed, respectively.

<Step 613>

Further, the quantized prediction residue data is locally decoded through processes at inverse quantization unit 4 and inverse orthogonal transformation unit 5, and then synthesized with the predicted image generated at step 611, whereby it is stored as a locally decoded image (a block of M×M pixels) of the object block of coding, in frame memory 6.

<Step 614>

Further, the quantized prediction residue data is also input to variable length coding unit 9 and subjected to variable length coding, and output as coded data.

<Step 615>

Steps 609 to 614 are repeated on all object blocks of coding forming the image as the object of coding.

Encoding in accordance with Background Art 2 is realized by the processes described above. In the moving picture encoding apparatus in accordance with Background Art 2, the object image of coding PicA is reduced, and the reduced image Pica is encoded through process steps similar to those of Background Art 1. The reduced image is subjected to intra-prediction and orthogonal transformation, and therefore, it is possible to utilize spatial correlation of wider range of image than in Background Art 1.

For the encoding of upper layer, inter-layer prediction is performed in which an image PicB obtained by enlarging an image Picb resulting from coding/decoding of lower layer is used as the predicted image, so that prediction of higher accuracy than prediction of PicA in accordance with Background Art 1 becomes possible. Non-Patent Document 1: ISO/IEC 14496-10:2004 Advanced Video Coding Non-Patent Document 2: ISO/IEC 14496-10:2006/FPDAM3 Scalable Video Coding.

DISCLOSURE OF THE INVENTION

Problems to be Solved by the Invention

As described above, in Background Art 1, the spatial correlation of images can be utilized only to a limited range as compared with Background Art 2, and therefore, highly efficient coding of an image having high spatial redundancy is impossible. Such a tendency grows as the resolution of images becomes higher.

On the other hand, Background Art 2 can utilize spatial correlation in wider range, as the intra-prediction is performed on the reduced image. It is not always the case, however, that Background Art 2 provides coding of higher efficiency than Background Art 1.

FIG. 9 includes graphs representing spatial frequency characteristics of images during the process of coding, when coding is done in accordance with Background Art 2. In the graphs, PicA to PicD correspond to images at process steps of encoding shown in FIG. 8, and PicE corresponds to the decoded image obtained by the decoding process.

FIG. 9 shows two examples, that is, an example in which the object image of coding includes signals of wide range from low to high frequency ranges (in the following, denoted as Case 1: solid line in the graphs) and an example which includes only the signals of low frequency range (in the following, denoted as Case 2: dotted line in the graphs). In the process of coding the lower layer (FIG. 9(b) to (d)), in consideration of aliasing, first, signals in the high frequency range are removed and thereafter coding process is done in the reducing process and, therefore, in either case, only the signals in low frequency range are processed, and the processes are not different. In the process of coding the upper layer, however, prediction residue appears only in Case 1 in predicted residual image PicD after inter-layer prediction, as shown in FIG. 9(e). When an image including signals in the wide frequency range of low to high frequencies as in Case 1 is to be encoded, prediction residue may possibly occur even in the low frequency range, during coding of the upper layer, because of influences of low-pass filtering in generating the reduced image and coding distortion experienced during coding of the lower layer. Then, it follows that signals existing in the low frequency range are coded both in the upper and lower layers in accumulative manner and, therefore, highly efficient coding becomes impossible. In other words, compression rate decreases.

The present invention was made in view of the foregoing, and its object is to solve the problem of wasteful coding process when hierarchical encoding process is used, while maintaining as much as possible the advantages of hierarchical encoding process.

Means for Solving the Problems

In order to attain the above-described object, according to an aspect, the present invention provides a moving picture encoding apparatus that divides an image into a plurality of blocks of a prescribed size and encodes. The moving picture encoding apparatus includes a prediction unit, an encoding unit, a prediction control unit and a prediction method information generating unit. The prediction unit is capable of executing prediction, for a block as an object of coding, in accordance with both intra-prediction method in which a predicted image is generated using a locally decoded image of a previously-coded neighboring block and a prediction method based on a reduced image in which a predicted image is generated using a locally decoded image of the block as the object of coding that has been coded and reduced. The encoding unit encodes using the predicted image provided by the prediction unit. The prediction control unit determines, for each of the prescribed blocks, as a method of prediction for the block as the object of coding, whether the intra-prediction method or the prediction method based on reduced image is to be used, and causing the prediction unit to execute prediction in accordance with the determined prediction method. The prediction information generating unit encodes prediction method information for identifying the prediction method determined for each of the prescribed blocks by the prediction control unit, so that the prediction method used for generating the encoded data can be identified when encoded data encoded by the encoding unit is decoded.

Preferably, the prediction unit includes an intra-prediction unit for generating, for a block as an object of coding, a predicted image using a locally decoded image of a previously-encoded neighboring block, and an up-sampling unit for enlarging encoded reduced image of the block and generating a predicted image of the block. The encoding unit uses the predicted image provided by the intra-prediction image when the prediction control unit determines to use the intra-prediction method, and uses the predicted image provided by the up-sampling unit when the prediction control unit determines to use the prediction method based on reduced image.

More preferably, the encoded and reduced image is subjected to intra-prediction using the intra-prediction unit and then encoded.

Preferably, the prediction information generating unit outputs, as the prediction method information, information as to whether prediction method for the prescribed block matches an estimated prediction method derived based on the prediction method used for encoding the previously-encoded block neighboring the prescribed block.

Preferably, the encoding unit does not encode a difference image between the predicted image provided by the prediction unit and the image of the block as the object of coding, when the prediction control unit selects the prediction method based on reduced image.

According to another aspect, the present invention provides a moving picture decoding apparatus for decoding coded data for each of the blocks forming an image. The moving picture decoding apparatus includes a prediction unit, a decoding unit, and a prediction method identifying unit. The prediction unit is capable of executing prediction, for a block as an object of decoding, in accordance with both intra-prediction method in which a predicted image is generated using a locally decoded image of a previously-decoded neighboring block and a prediction method based on reduced image in which a predicted image is generated using the block as the object of decoding that has been decoded and reduced. The decoding unit uses the predicted image provided by the prediction unit for decoding. The prediction method identifying unit identifies prediction method from prediction method information identifying the prediction method used for the block as the object of decoding. The prediction unit executes prediction in accordance with the prediction method identified by the prediction method identifying unit.

Preferably, the prediction unit includes an intra-prediction unit for generating, for a block as an object of decoding, a predicted image using a locally decoded image of a previously-decoded neighboring block, and an up-sampling unit for enlarging decoded reduced image of the block and generating a predicted image of the block. The decoding unit uses the predicted image provided by the intra-prediction image for decoding when the prediction method identifying unit identifies the intra-prediction method, and uses the predicted image provided by the up-sampling unit for decoding when the prediction method identifying unit identifies the prediction method based on reduced image.

More preferably, the decoded reduced image is image data decoded and then subjected to intra-prediction using the intra-prediction unit.

Preferably, the prediction method identifying unit outputs, as the prediction method information, information as to whether prediction method for the block as the object of decoding matches an estimated prediction method derived based on the prediction method used for decoding the previously-decoded block neighboring the block as the object of decoding.

Preferably, the decoding unit uses, when the prediction control unit selects the prediction method based on reduced image, the predicted image provided by the prediction unit as the decoded image of the block as the object of decoding.

EFFECTS OF THE INVENTION

The moving picture encoding apparatus and the moving picture decoding apparatus in accordance with the present invention provide highly efficient coding and decoding by adaptively switching method of prediction block by block of a prescribed size. Further, in the moving picture encoding apparatus in accordance with the present invention, when prediction is done based on a reduced image, low-pass filtering for generating the reduced image is unnecessary and, therefore, processing load can be reduced.

DESCRIPTION OF THE REFERENCE SIGNS 1 intra-prediction unit, 2 orthogonal transformation unit, 3 quantization unit, 4 inverse quantization unit, 5 inverse orthogonal transformation unit, 6 frame memory, 7 down-sampling unit, 8 up-sampling unit, 9 variable length coding unit, 10 change-over switch, 11 prediction control unit, 12 variable length decoding unit, 13 filtering unit, 14 layer switching control unit.

BEST MODES FOR CARRYING OUT THE INVENTION

[Embodiment 1]

Figure 1:
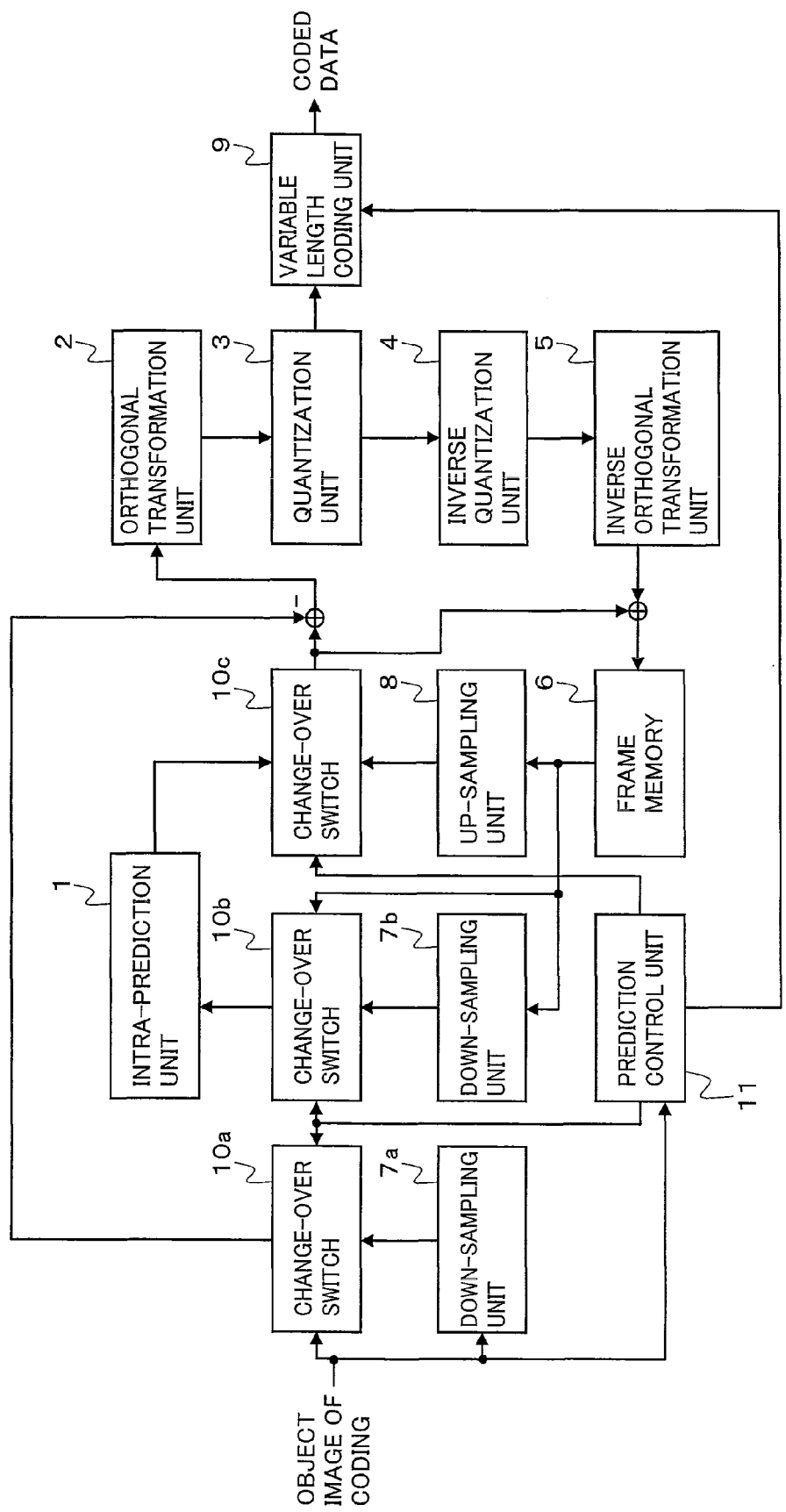
FIG. 1 is a block diagram showing the moving picture encoding apparatus in accordance with a first embodiment of the present invention.
Figure 7:
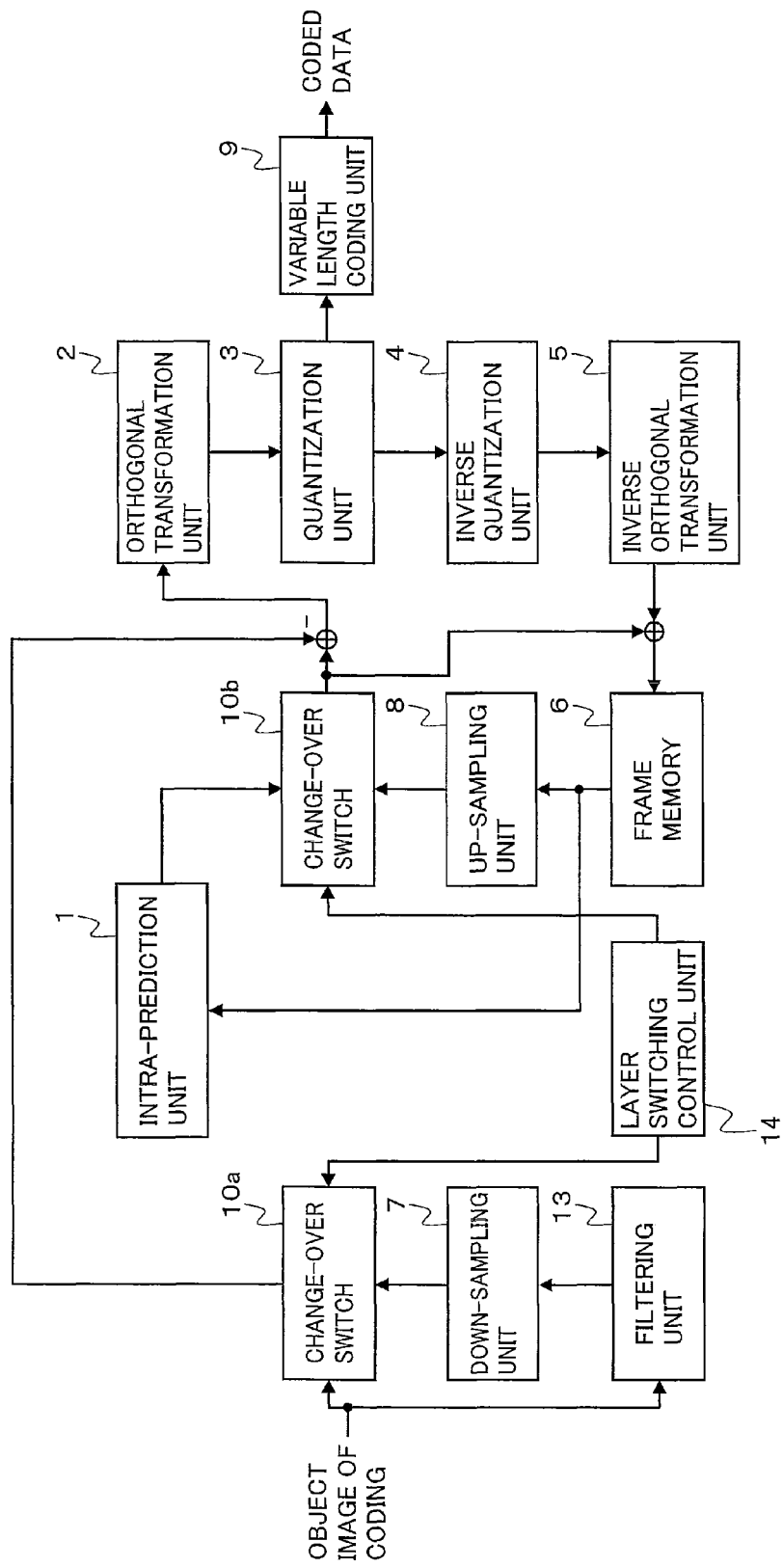
FIG. 7 is a block diagram of the moving picture encoding apparatus using Background Art 2.
Figure 8:
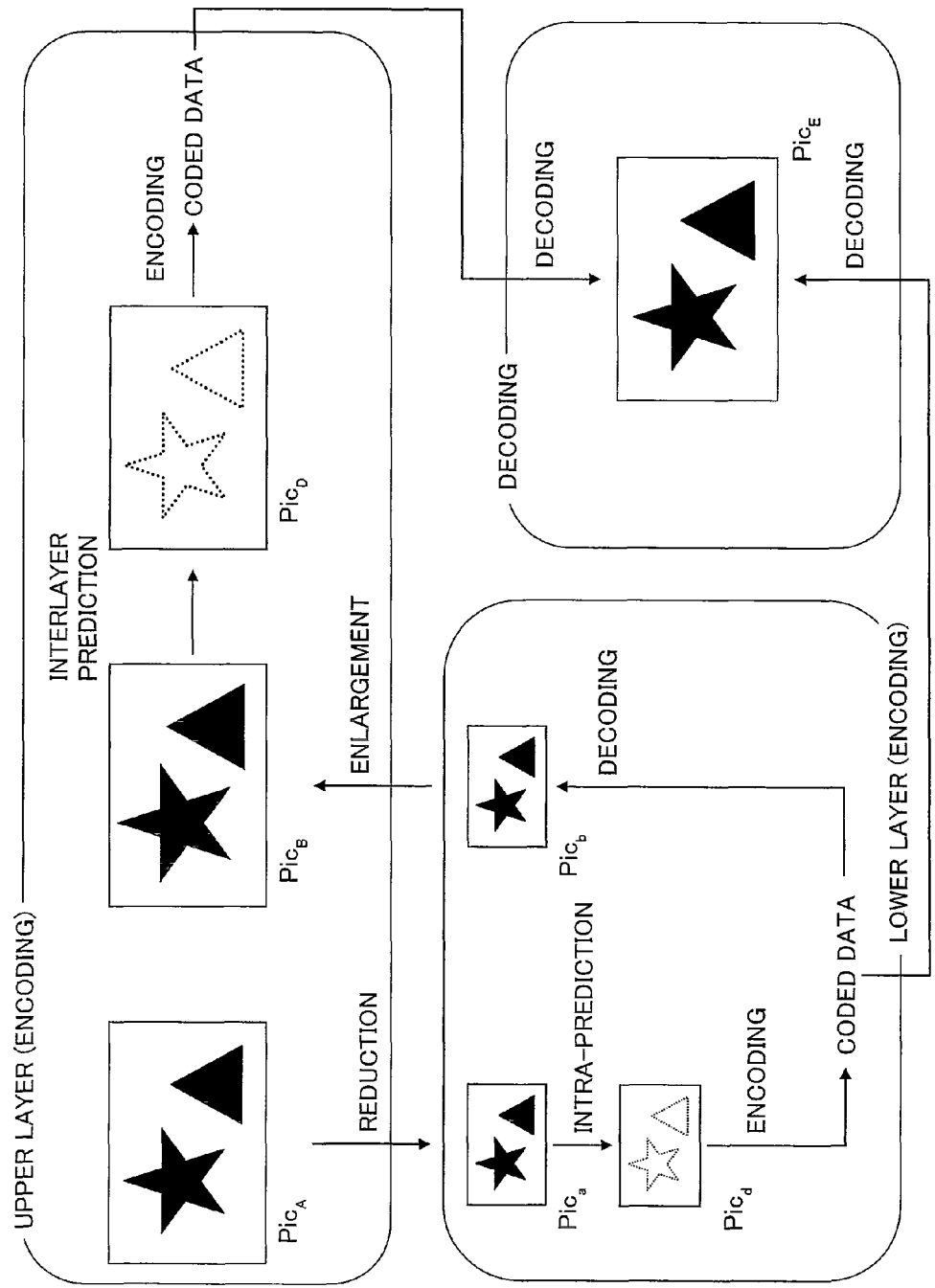
FIG. 8 is an illustration of encoding process in accordance with Background Art 2.
Figure 9:
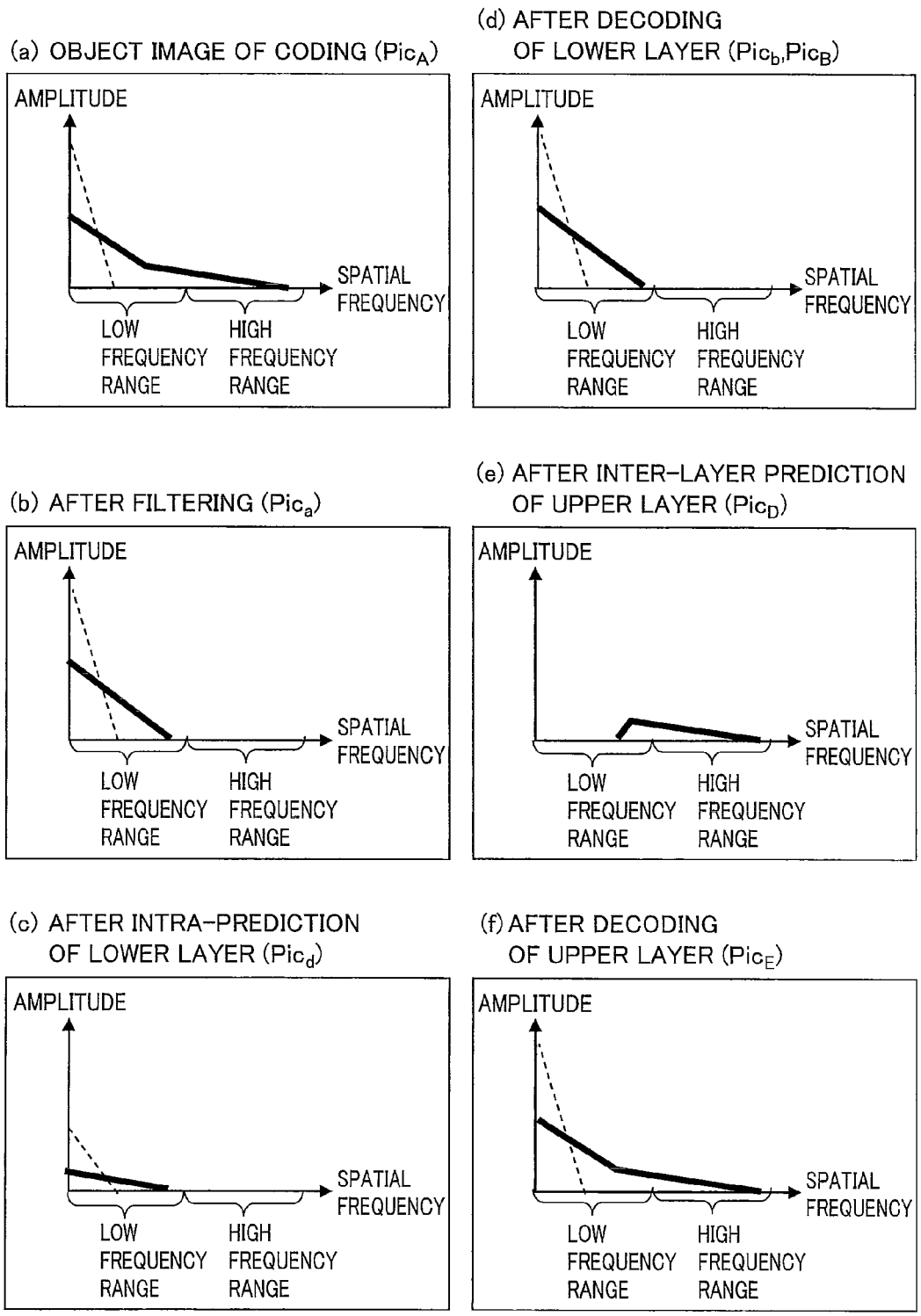
FIGS. 9(a)-(f) are illustrations of encoding characteristics in accordance with Background Art 2.

First, the moving picture encoding apparatus in accordance with the first embodiment of the present invention will be described. FIG. 1 is a block diagram of the moving picture encoding apparatus in accordance with the present embodiment. Referring to FIG. 1, a prediction control unit 11 controls change-over switches 10a, 10b and 10c block by block as the object of coding of an object image of coding, to determine the method of prediction to be used for the corresponding block as the object of coding. Other components are the same as those of moving picture encoding apparatus shown in FIG. 7 and, therefore, detailed description thereof will not be repeated.

Next, an operation of moving picture encoding apparatus in accordance with the present embodiment will be described. The moving picture encoding apparatus in accordance with the present embodiment operates in the following manner. In the following description also, it is assumed that encoding and decoding are performed on a block of N×N pixels and a block of M×M pixels as units, as in the description of BACKGROUND ART <Step 101>

The object image of coding is divided to blocks of a prescribed size (blocks each of N×N pixels), and each block (hereinafter referred to as the object block of coding) is input to the moving picture encoding apparatus.

<Step 102>

Prediction control unit 11 determines a prediction method to be used for the block, based on spatial frequency characteristic of the object block of coding. If the corresponding block contains prescribed amount or more of high-frequency component, intra-prediction is used as in Background Art 1. If the high frequency component in the block is smaller than the prescribed amount, the control unit controls such that prediction based on a reduced image is performed on the block. Details of the method of determining prediction method will be described later.

The method of prediction used for the block of interest determined by prediction control unit 11 is subjected to variable length coding at variable length coding unit 9, and output as coded data.

Further, prediction control unit 11 controls change-over switches 10a, 10b and 10c, and if prediction is done by intra-prediction as in Background Art 1, it sets change-over switch 10a to output the object image of coding, change-over switch 10b to output the locally decoded image output from frame memory 6, and change-over switch 10c to output the predicted image output from intra-prediction unit 1, respectively. In this case, process steps 103 to 108 take place thereafter.

If prediction is to be done based on a reduced image, once, change-over switches 10a and 10b are set to provide the reduced image output from the down-sampling unit, and change-over switch 10c is set to provide the predicted image output from intra-prediction unit 1, respectively, and process steps following step 109 are performed.

<Step 103>

The object block of coding is further divided to blocks of a prescribed size (blocks each of M×M pixels), and for each block, the following process steps are performed.

<Step 104>

Intra-prediction unit 1 generates a predicted image (a block of M×M pixels) for the corresponding block. The predicted image is generated by performing intra-prediction using a locally decoded image or images of a previously-encoded neighboring block or blocks stored in frame memory 6.

<Step 105>

Prediction residue data (a block of M×M pixels) representing difference between the block of interest and the predicted image generated at step 104 is input to orthogonal transformation unit 2 and quantization unit 3 in this order, and subjected to orthogonal transformation and quantization, respectively.

<Step 106>

Further, the quantized prediction residue data is locally decoded through processes at inverse quantization unit 4 and inverse orthogonal transformation unit 5, and then synthesized with the predicted image generated at step 102, whereby it is stored as the locally decoded image (a block of M×M pixels) of the block, in frame memory 6.

<Step 107>

Further, the quantized prediction residue data is also input to variable length coding unit 9 and subjected to variable length coding, and then output as coded data.

<Step 108>
Steps 103 to 107 are repeated on all blocks (blocks each of M×M pixels) forming the object block of coding (block of N×N pixels), and then the process of step 119 is performed.

<Step 109>
Down-sampling unit 7a generates a reduced image (a block of M×M pixels) for the object block of coding. Specifically, it divides the object block of coding (block of N×N pixels) into M×M small square areas, and a pixel at an upper left position of each small area is extracted, whereby the reduced image is generated.

<Step 110>
Intra-prediction unit 1 generates a predicted image (a block of M×M pixels) for the reduced image generated at step 109. Here, the predicted image is generated by intra-prediction using a block of pixels obtained by a reducing process at down-sampling unit 7b of locally decoded images (blocks each of N×N pixels) in previously-encoded neighboring blocks stored in frame memory 6. The reducing process at down-sampling unit 7b is the same as the reducing process at down-sampling unit 7a.

<Step 111>
Prediction residue data (a block of M×M pixels) representing difference between the reduced image generated at step 109 and the predicted image of the corresponding block generated at step 110 is input to orthogonal transformation unit 2 and quantization unit 3 in this order, and subjected to orthogonal transformation and quantization, respectively.

<Step 112>
Further, the quantized prediction residue data is locally decoded through processes at inverse quantization unit 4 and inverse orthogonal transformation unit 5, and then synthesized with the predicted image generated at step 110, whereby it is stored as the locally decoded image (a block of M×M pixels) of the block, in frame memory 6.

<Step 113>
Further, the quantized prediction residue data is also input to variable length coding unit 9 and subjected to variable length coding, and then output as coded data.

<Step 114>
Prediction control unit 11 controls change-over switches 10a and 10c such that change-over switch 10a outputs the object image of coding and change-over switch 10c outputs the enlarged image output from up-sampling unit 8, respectively.

<Step 115>
Up-sampling unit 8 generates the enlarged image (a block of N×N pixels) from the locally decoded image (a block of M×M pixels) of the reduced image stored in frame memory 6 at step 112. The enlarged image is output as the predicted image for the object image of coding.

<Step 116>
The object block of coding is divided into blocks of M×M pixels, and prediction residue data (a block of M×M pixels) representing difference between each of the blocks of pixels and the corresponding area of predicted image obtained at step 115 is input to orthogonal transformation unit 2 and quantization unit 3, where orthogonal transformation and quantization are executed.

<Step 117>
Further, the quantized prediction residue data is locally decoded through processes at inverse quantization unit 4 and inverse orthogonal transformation unit 5, and then synthesized with the predicted image generated at step 111, whereby it is stored as the locally decoded image (a block of M×M pixels) of the object block of coding, in frame memory 6.

<Step 118>
Further, the quantized prediction residue data is also input to variable length coding unit 9 and subjected to variable length coding, and then output as coded data.

<Step 119>
Steps 101 to 118 are repeated an all object blocks of coding forming the object image of coding.

As described above, in the moving picture encoding apparatus in accordance with the present embodiment, method of prediction is adaptively switched between intra-prediction and prediction based on reduced image for every block of a prescribed size and, therefore, highly efficient coding can be realized.

Next, details of the method of determining prediction method at step 102 of the operation of moving picture encoding apparatus as above will be described. As described above, prediction control unit 11 determines the method of prediction dependent on the estimated value of high-frequency component included in the object block of coding. The estimated value of high-frequency component AH in the object block of coding consisting of 8×8 pixels is given by the following equation.

$$AH = \sum_{u=4}^{u<8} \sum_{v=4}^{v<8} A(u, v)$$

Here, A(u, v) represents frequency component obtained by DCT transformation of an image a(i, j) of the object block of coding. Here, i and j represent horizontal and vertical positions in the block, respectively. Further, u and v represent positions of horizontal and vertical frequency components obtained by DCT transformation for the block of 8×8 pixels.

Prediction control unit 11 uses a threshold value D1 determined in advance through experiment, to perform prediction based on the reduced image if estimated value of high-frequency component AH is smaller than D1 and to perform intra-prediction similar to Background Art 1 if AH is not smaller than D1.

In the description above, prediction control unit 11 determines the method of prediction used for a block based on the spatial frequency characteristic of the object block of coding. It is also possible, however, to once perform coding using both methods, and then to determine the method of prediction to be used for the block based on the amount of generated codes and the amount of distortion included in locally decoded image.

Further, for the moving picture encoding apparatus in accordance with the present embodiment, an arrangement in which prediction method is switched between only two methods, that is, intra-prediction and prediction using reduced image, has been described. An arrangement allowing adaptive switching among a plurality of intra-predicting methods having different prediction characteristics may be possible. By way of example, a prediction method in which using a DCT coefficient obtained by DCT transform of a block neighboring the object block of coding, the DCT coefficient of the block of interest is predicted and the predicted image of the block is obtained by inverse DCT of the predicted DCT coefficient, may be added to the two prediction methods described in the foregoing.

Figure 2:
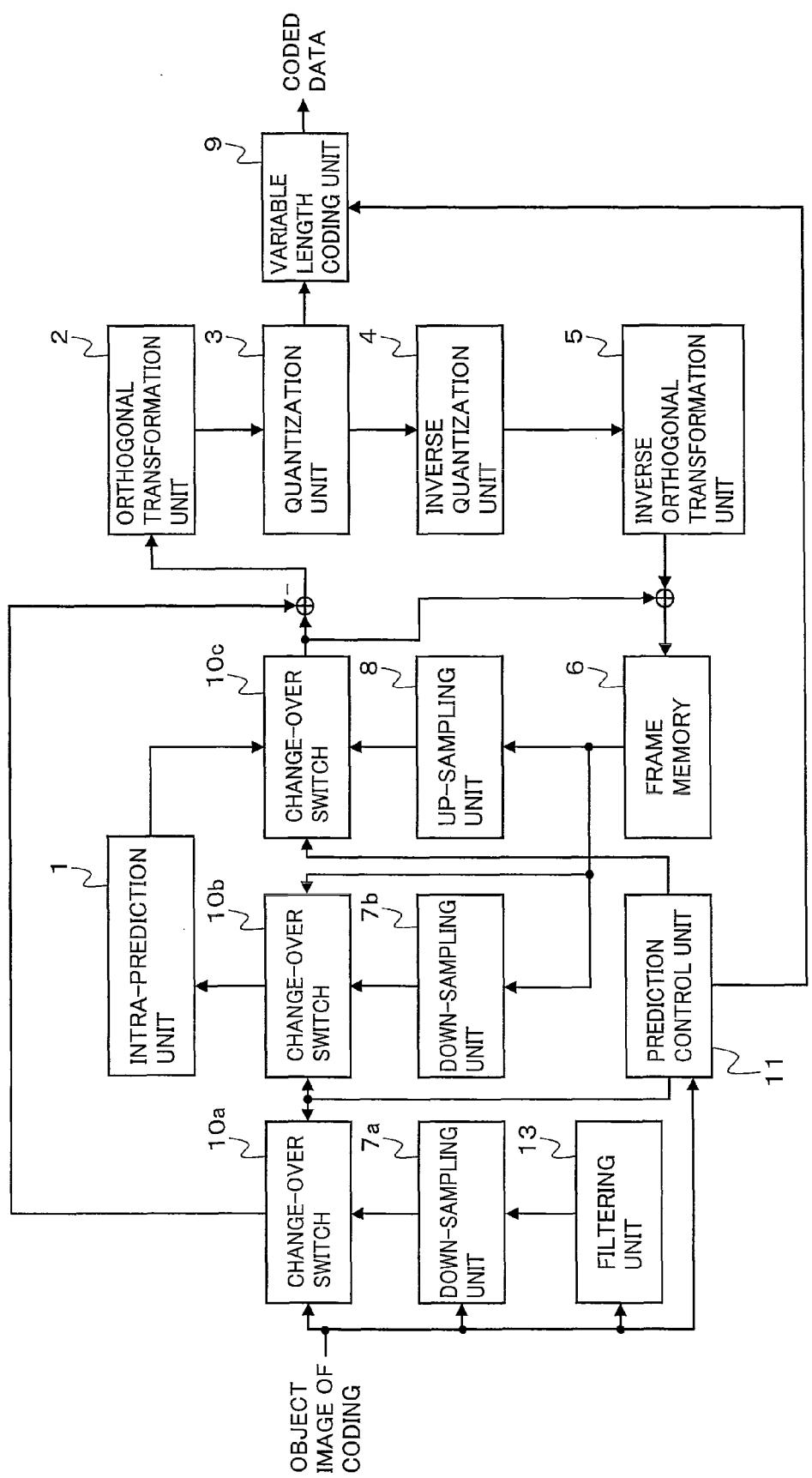
FIG. 2 is a block diagram showing the moving picture encoding apparatus in accordance with another form of the first embodiment of the present invention.

In the moving picture encoding apparatus in accordance with the present embodiment, spatial frequency component included in the object image is analyzed, and prediction using reduced image is performed only when there is hardly any high-frequency component. Therefore, low-pass filtering, that has been indispensable in consideration of aliasing in forming the reduced image in accordance with Background Art 2, becomes unnecessary. It is possible, however, to adopt an arrangement such as shown in FIG. 2, in which low-pass filtering is performed prior to down-sampling, in order to remove noise in high-frequency component and to further improve efficiency of coding.

In the description of moving picture encoding apparatus in accordance with the present embodiment, the method of prediction used for the block of interest determined by prediction control unit 11 is subjected to variable length coding at variable length coding unit 9. Alternatively, prediction control unit 11 may estimate the method of prediction used for the block of interest based on the prediction method had been used for encoding a neighboring block or blocks, and information as to whether the prediction method used for the block and the estimated prediction method is the same or not may be variable-length-coded at variable length coding unit 9. By way of example, let us represent the prediction method used for coding the block of interest by Pc, and prediction methods used for neighboring blocks at the top and left positions of the block of interest by Pt and Pl, respectively. If Pt and P1 are both predictions based on reduced images, prediction based on a reduced image is used as the estimated value of Pc, and otherwise, intra-prediction is used as the estimated value of Pc. By utilizing correlation between the prediction method for the block of interest and the prediction method for neighboring blocks, number of codes necessary for encoding by the prediction method can be reduced.

Figure 3:
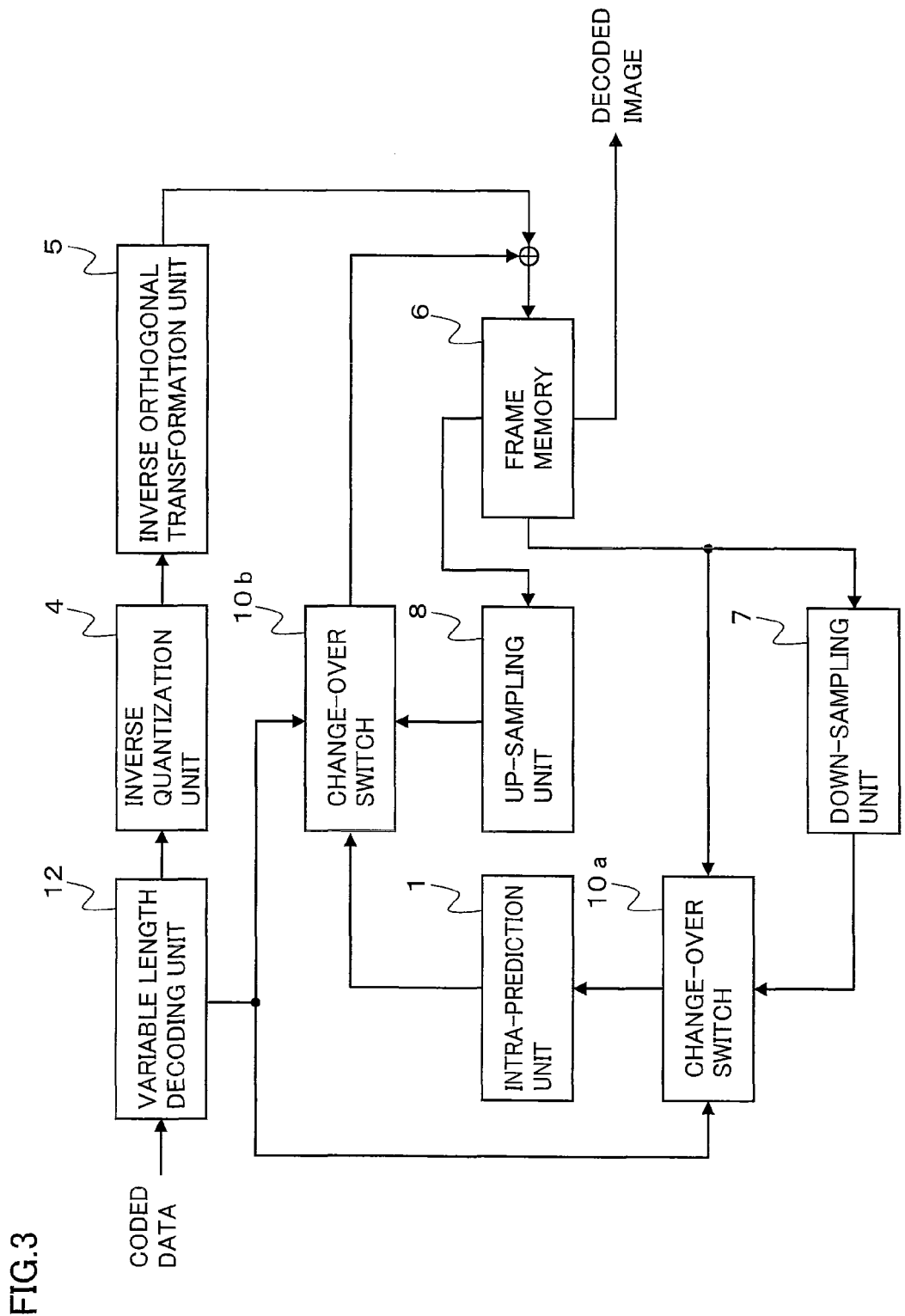
FIG. 3 is a block diagram showing the moving picture decoding apparatus in accordance with the first embodiment of the present invention.

Next, the moving picture decoding apparatus in accordance with the present embodiment will be described. FIG. 3 is a block diagram showing the moving picture decoding apparatus in accordance with the present embodiment.

Referring to FIG. 3, variable length decoding unit 12 performs variable length decoding of coded data. Other configurations are the same as the elements of moving picture decoding apparatus shown in FIG. 1 and, therefore, detailed description thereof will not be repeated.

<Step 201>

From the input coded data, prediction method used for the image as the object of decoding (hereinafter referred to as object block of decoding) as a block of N×N pixels is decoded at variable length decoding unit 12.

Here, when intra-prediction similar to that of Background Art 1 is used, change-over switch 10a is set to provide the locally decoded image output from frame memory 6, and thereafter, process steps 202 to 205 are executed.

On the other hand, when prediction based on a reduced image is used, change-over switch 10a is set to provide the result of output from down-sampling unit 7, and the process following step 206 is executed.

No matter which prediction method is used, change-over switch 10b is once set to provide the predicted image output from intra-prediction unit 1.

<Step 202>

The object block of decoding is divided to blocks of a prescribed size (blocks of M×M pixels), and for each block, variable length decoding of prediction residue data is performed at variable length decoding unit 12.

<Step 203>

Intra-prediction unit 1 generates a predicted image (a block of M×M pixels) for the corresponding block.

<Step 204>

The prediction residue data that has been subjected to variable length decoding at step 202 is locally decoded through processes at inverse quantization unit 4 and inverse orthogonal transformation unit 5, and synthesized with predicted image generated at step 203, whereby it is stored as a locally decoded image (a block of M×M pixels) of the object block of decoding, in frame memory 6.

<Step 205>

Steps 202 to 204 are repeated on all blocks forming the object block of decoding, and then the process of step 214 is executed.

<Step 206>

For the reduced image (a block of M×M pixels) for the object block of decoding, variable length decoding of prediction residue data is performed at variable length decoding unit 12.

<Step 207>

Intra-prediction unit 1 generates a predicted image (a block of M×M pixels) for the block of interest. For the intra-prediction, as in the moving picture encoding apparatus, the locally decoded images of neighboring blocks stored in frame memory 6 are used after reduction at down-sampling unit 7b.

<Step 208>

The prediction residue data that has been subjected to variable length decoding at step 206 is locally decoded through the processes at inverse quantization unit 4 and inverse orthogonal transformation unit 5, and then synthesized with the predicted image generated at step 207, whereby it is stored as the locally decoded image (a block of M×M pixels) of the corresponding block, in frame memory 6.

<Step 209>

Variable length decoding unit 12 controls change-over switch 10b, and switches the output of change-over switch 10b to the enlarged image output from up-sampling unit 8.

<Step 210>

The object block of decoding is further divided to blocks of a prescribed size (blocks each of M×M pixels), and for each block, variable length decoding of prediction residue data is performed at variable length decoding unit 12.

<Step 211>

Up-sampling unit 8 generates an enlarged image (a block of M×M pixels) based on the locally decoded image of the reduced image stored in the frame memory at step 208.

The enlarged image is output as the predicted image for the object block of decoding.

<Step 212>

The prediction residue data that has been subjected to variable length decoding at step 210 is locally decoded through the processes at inverse quantization unit 4 and inverse orthogonal transformation unit 5, and then synthesized with the predicted image generated at step 211, whereby it is stored as the locally decoded image (a block of M×M pixels) of the corresponding block, in frame memory 6.

<Step 213>

Steps 206 to 212 are repeated on all blocks forming the object block of decoding.

<Step 214>

Steps 201 to 213 are repeated on all object blocks of decoding forming the object image of decoding.

By the processes performed by the moving picture decoding apparatus as described above, the coded data generated by the moving picture encoding apparatus in accordance with the present embodiment is decoded.

[Embodiment 2]

Next, the moving picture encoding apparatus and the moving picture decoding apparatus in accordance with the second embodiment of the present invention will be described in order.

Figure 4:
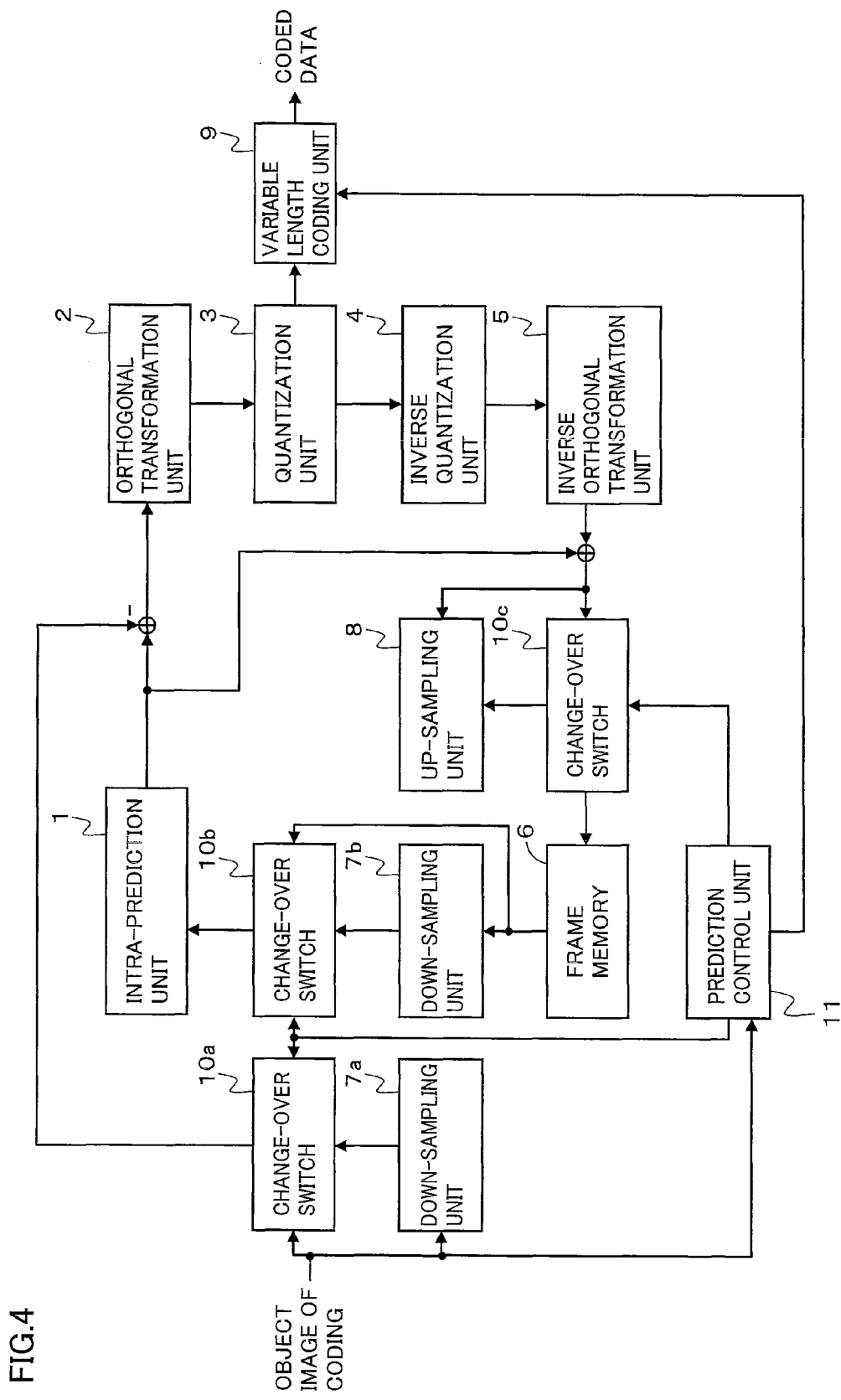
FIG. 4 is a block diagram showing the moving picture encoding apparatus in accordance with a second embodiment of the present invention.

First, the moving picture encoding apparatus in accordance with the present embodiment will be described. FIG. 4 is a block diagram showing the moving picture encoding apparatus in accordance with the second embodiment of the present invention. Various components are the same as the components of moving picture encoding apparatus shown in FIG. 1 and, therefore, detailed description thereof will not be repeated.

The moving picture encoding apparatus in accordance with the present embodiment operates in the following manner.

<Step 301>
An image as an object of coding is divided to blocks of a prescribed size (blocks each of N×N pixels), and each block (hereinafter referred to as an object block of coding) is input to the moving picture encoding apparatus.

<Step 302>
Prediction control unit 11 determines a prediction method to be used for the object block of coding, based on spatial frequency characteristic of the object block of coding. If the corresponding block contains prescribed amount or more of high-frequency component, intra-prediction is used as in Background Art 1. If the high frequency component in the block is smaller than the prescribed amount, the control unit controls such that prediction based on a reduced image is performed on the block.

The method of prediction used for the block of interest determined by prediction control unit 11 is subjected to variable length coding at variable length coding unit 9, and output as coding data.

Further, prediction control unit 11 controls change-over switches 10a, 10b and 10c, such that if prediction is done by intra-prediction as in Background Art 1, change-over switch 10a provides the object image of coding as the output, change-over switch 10b provides the locally decoded image output from frame memory 6 as the output, and change-over switch 10c provides a synthesized image formed by the outputs of intra-prediction unit 1 and inverse orthogonal transformation unit 5 as the output, respectively. In this case, process steps 303 to 308 take place thereafter.

If prediction is to be done based on the reduced image, change-over switches 10a and 10b are set to provide the reduced image output from the down-sampling unit and change-over switch 10c is set to provide the enlarged image output from up-sampling unit 8, respectively, and process steps following step 309 are performed.

<Step 303>
The object block of coding is further divided to blocks of a prescribed size (blocks each of M×M pixels), and for each block, the following process steps are performed.

<Step 304>
Intra-prediction unit 1 generates a predicted image (a block of M×M pixels) for the corresponding block. The predicted image is generated by performing intra-prediction using locally decoded images of previously-encoded neighboring block or blocks stored in frame memory 6.

<Step 305>
Prediction residue data (a block of M×M pixels) representing difference between the block of interest and the predicted image generated at step 304 is input to orthogonal transformation unit 2 and quantization unit 3 in this order, and subjected to orthogonal transformation and quantization, respectively.

<Step 306>
Further, the quantized prediction residue data is locally decoded through processes at inverse quantization unit 4 and inverse orthogonal transformation unit 5, and then synthesized with the predicted image generated at step 302, whereby it is stored as the locally decoded image (a block of M×M pixels) of the block, in frame memory 6.

<Step 307>
Further, the quantized prediction residue data is also input to variable length coding unit 9 and subjected to variable length coding, and then output as coded data.

<Step 308>
Steps 303 to 307 are repeated on all blocks forming the object block of coding, and then the process of step 314 is performed.

<Step 309>
Down-sampling unit 7a generates a reduced image (a block of M×M pixels) for the object block of coding.

<Step 310>
Intra-prediction unit 1 generates a predicted image (a block of M×M pixels) for the reduced image generated at step 309.

Here, the predicted image is generated by intra-prediction using a block of pixels obtained by a reducing process at down-sampling unit 7b of locally decoded images in previously-encoded neighboring blocks stored in frame memory 6.

<Step 311>
Prediction residue data (a block of M×M pixels) representing difference between the block of interest and the reduced image generated at step 309 is input to orthogonal transformation unit 2 and quantization unit 3 in this order, and subjected to orthogonal transformation and quantization, respectively.

<Step 312>
Further, the quantized prediction residue data is further subjected to local decoding through processes at inverse quantization unit 4 and inverse orthogonal transformation unit 5, and then synthesized with the predicted image generated at step 310.

<Step 313>
The image obtained at step 312 (a block of M×M pixels) is enlarged by the interpolating process by up-sampling unit 8, and stored as the locally decoded image (a block of N×N pixels) of the object block of coding, in frame memory 6.

<Step 314>
Steps 301 to 313 are repeated on all object blocks of coding forming the object image of coding.

As described above, in the moving picture encoding apparatus in accordance with the present embodiment, as in the moving picture encoding apparatus in accordance with the first embodiment, highly efficient coding is realized through adaptive switching of predicting method.

Further, in the moving picture encoding apparatus in accordance with the present embodiment, when prediction using reduced image is performed, only the result of coding the reduced image is encoded, utilizing the fact that there is hardly any high-frequency component in the block of interest. Specifically, in the moving picture encoding apparatus in accordance with the present embodiment, the difference image between the image obtained by up-sampling the locally decoded reduced image and the block of interest is not encoded, whereby efficiency of coding can further be improved. Further, as there is hardly any high-frequency component in the block of interest, low-pass filtering for forming the reduced image is unnecessary in the moving picture encoding apparatuses shown in FIGS. 1 and 4 when prediction is done based on the reduced image and, therefore, load of processing can be reduced.

Figure 5:
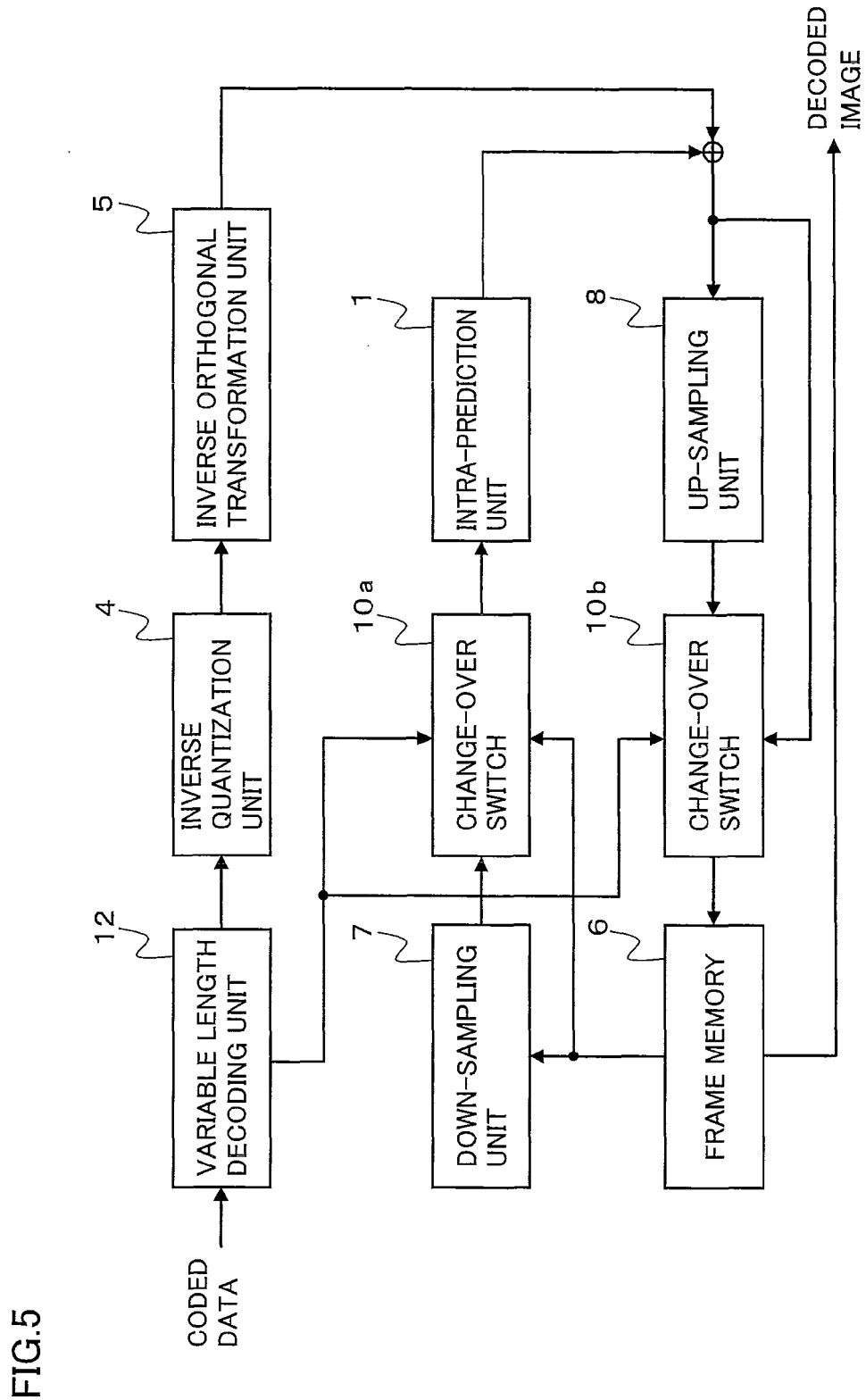
FIG. 5 is a block diagram of the moving picture decoding apparatus in accordance with the second embodiment of the present invention.
Figure 6:
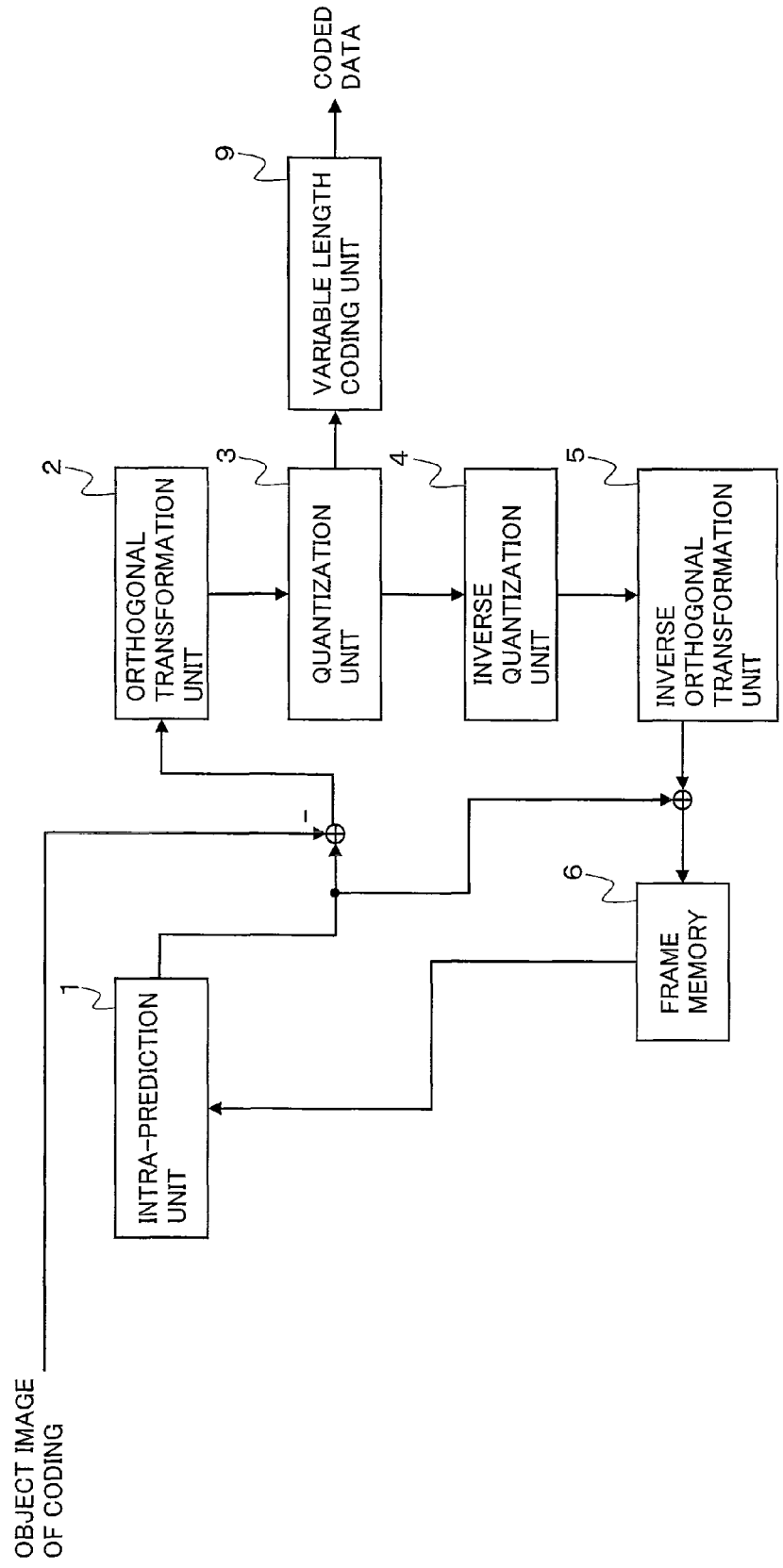
FIG. 6 is a block diagram of the moving picture encoding apparatus using Background Art 1.

Next, the moving picture decoding apparatus in accordance with the present embodiment will be described. FIG. 5 is a block diagram showing the moving picture decoding apparatus in accordance with the second embodiment of the present invention. Various components are the same as the components of moving picture decoding apparatus shown in FIG. 3 and, therefore, description thereof will not be repeated. The moving picture decoding apparatus in accordance with the present embodiment operates in the following manner.

<Step 401>

From the input coded data, prediction method used for the image as the object of decoding (hereinafter referred to as object block of decoding) as a block of N×N pixels is decoded at variable length decoding unit 12.

Here, when intra-prediction similar to that of Background Art 1 is used, the output of change-over switch 10a is set to the locally decoded image output from the frame memory, and the output of change-over switch 10b is set to the synthesized image of the outputs of intra-prediction unit 1 and inverse orthogonal transformation unit 5, and thereafter, steps 402 to 405 are executed.

On the other hand, when prediction based on a reduced image is used, change-over switch 10a is set to provide the output from down-sampling unit 7 and change-over switch 10b is set to provide the output of up-sampling unit 8, and thereafter the process following step 406 is executed.

<Step 402>

The object block of decoding is divided to blocks of a prescribed size (blocks each of M×M pixels), and for each block, variable length decoding of prediction residue data is performed at variable length decoding unit 12.

<Step 403>

Intra-prediction unit 1 generates a predicted image (a block of M×M pixels) for the corresponding block.

<Step 404>

The prediction residue data that has been variable-length-decoded at step 402 is locally decoded through processes at inverse quantization unit 4 and inverse orthogonal transformation unit 5, and synthesized with predicted image generated at step 403, whereby it is stored as a locally decoded image (a block of M×M pixels) of the object block of decoding, in frame memory 6.

<Step 405>

Steps 402 to 404 are repeated on all blocks forming the object block of decoding, and then the process of step 409 is executed.

<Step 406>

For the reduced image (a block of M×M pixels) for the object block of decoding, variable length decoding of prediction residue data is performed at variable length decoding unit 12.

<Step 407>

Intra-prediction unit 1 generates a predicted image (a block of M×M pixels) for the block of interest. For the intra-prediction, as in the moving picture encoding apparatus, the locally decoded images of neighboring blocks stored in frame memory 6 are used after reduction at down-sampling unit 7.

<Step 408>

The prediction residue data that has been subjected to variable length decoding at step 406 is locally decoded through the processes at inverse quantization unit 4 and inverse orthogonal transformation unit 5, and then synthesized with the predicted image generated at step 407, enlarged to a block of N×N pixels at up-sampling unit 8, and stored as the locally decoded image of the block, in frame memory 6.

<Step 409>

Steps 401 to 408 are repeated on all object blocks of decoding forming the object image of decoding.

By the above-described processes by the moving picture decoding apparatus, the coded data generated by the moving picture encoding apparatus in accordance with the present embodiment is decoded.

[Other Modifications]

In the following, modifications will be described.

(1) A method of enlarging the reduced image at step 115 (FIG. 1) or step 313 (FIG. 4) of the operation of moving picture encoding apparatus described above will be described in the following. Other than the method defined by Background Art 2, there is a method of obtaining a predicted image through up-sampling. By way of example, in Background Art 2, up-sampling is done basically using a 6-tap interpolation filter based on Lanczos3 function, whereby high-frequency component of the image can be interpolated with high accuracy. In the present invention, however, prediction is done based on the reduced image only for the range not much including high-frequency component. Therefore, influence on coding efficiency is low even when a 2-tap linear interpolation filter, which attains lower accuracy of interpolating high-frequency component, is used. When a 2-tap linear interpolation filter is used, load of processing necessary for up-sampling can be reduced.

(2) In the description of moving picture encoding apparatus above, the reduced image is prepared by extracting pixels each positioned at an upper left corner of each of M×M small areas at down-sampling units 7a and 7b. It is also possible to form the reduced image by extracting pixels at a different position, for example, at a lower right corner, of each small area. If a block is processed in the order of raster scanning, the number of pixels that can be referred to at the time of up-sampling increases by forming the reduced image using pixels at lower right positions in the small areas and, as a result, accuracy of predicted image based on the reduced image advantageously increases.

The embodiments as have been described here are mere examples and should not be interpreted as restrictive. The scope of the present invention is determined by each of the claims with appropriate consideration of the written description of the embodiments and embraces modifications within the meaning of and equivalent to, the languages in the claims.

The invention claimed is:

1. A moving picture decoding apparatus for decoding encoded data in each of blocks forming an image, comprising:

a prediction unit capable of executing prediction, for a block as an object of decoding, in accordance with both intra-prediction method in which a predicted image is generated using a locally decoded image of a previously-decoded neighboring block and a prediction method based on reduced image in which a predicted image is generated using said block as the object of decoding that has been decoded and reduced;

a decoding unit for using the predicted image provided by the prediction unit for decoding; and a prediction method identifying unit for identifying prediction method from prediction method information identifying the prediction method used for said block as the object of decoding; wherein said prediction unit executes prediction in accordance with the prediction method identified by said prediction method identifying unit, said prediction unit includes an up-sampling unit for enlarging decoded reduced image of the block and generating a predicted image of the block, said decoding unit uses the predicted image provided by said up-sampling unit for decoding when said prediction method identifying unit identifies, as the prediction method used for said block as the object of decoding, said prediction method based on reduced image, and said decoded reduced image is subjected to intra-prediction using an intra-prediction unit and then encoded.

2. The moving picture decoding apparatus according to claim 1, wherein said decoding unit uses, when said prediction control unit selects said prediction method based on reduced image, the predicted image provided by said prediction unit as the decoded image of the block as the object of decoding.

* * * * *